(12) United States Patent
Moganty et al.

(10) Patent No.: US 9,680,148 B2
(45) Date of Patent: Jun. 13, 2017

(54) FUNCTIONALIZED CARBONS FOR LITHIUM-SULFUR BATTERIES

(71) Applicant: NOHMs Technologies, Inc., Rochester, NY (US)

(72) Inventors: Surya Moganty, Henrietta, NY (US); Gabriel Torres, Rochester, NY (US); Jonathan Lee, Rochester, NY (US)

(73) Assignee: NOHMS Technologies, Inc., Rochester, NY (US)

( * ) Notice: Subject to any disclaimer, the term of this patent is extended or adjusted under 35 U.S.C. 154(b) by 237 days.

(21) Appl. No.: 14/516,924

(22) Filed: Oct. 17, 2014

(65) Prior Publication Data

US 2015/0155549 A1    Jun. 4, 2015

Related U.S. Application Data

(60) Provisional application No. 61/892,713, filed on Oct. 18, 2013.

(51) Int. Cl.

| | | |
|---|---|---|
| *H01M 4/36* | (2006.01) | |
| *H01M 4/62* | (2006.01) | |
| *C01B 31/02* | (2006.01) | |
| *H01M 4/583* | (2010.01) | |
| *H01M 4/133* | (2010.01) | |
| *H01M 4/60* | (2006.01) | |
| *H01M 4/38* | (2006.01) | |
| *H01M 10/052* | (2010.01) | |
| *H01M 4/02* | (2006.01) | |

(52) U.S. Cl.
CPC ............. *H01M 4/364* (2013.01); *C01B 31/02* (2013.01); *H01M 4/133* (2013.01); *H01M 4/38* (2013.01); *H01M 4/583* (2013.01); *H01M 4/60* (2013.01); *H01M 4/625* (2013.01); *H01M 10/052* (2013.01); *H01M 2004/028* (2013.01)

(58) Field of Classification Search
None
See application file for complete search history.

(56) References Cited

U.S. PATENT DOCUMENTS

2005/0244644 A1* 11/2005 Hampden-Smith .. B01J 31/1625
428/408
2012/0116094 A1* 5/2012 Swager ............... C01B 31/0213
548/256

OTHER PUBLICATIONS

He et al. Adsorption (2012) 18:23-29.*
Wang et al. J. Mater. Chem. A, 2013, 1, 9382.*

* cited by examiner

*Primary Examiner* — Sarah A Slifka
*Assistant Examiner* — Wojciech Haske
(74) *Attorney, Agent, or Firm* — Bond, Schoeneck & King, PLLC; Joseph Noto

(57) ABSTRACT

This invention provides for a functionalized porous carbon particle comprising a porous carbon particle linked to a functional group having affinity for a polysulfide, a porous solvent infused carbon particle comprising the porous carbon particle thereof, and a positive electrode comprising the porous carbon particle thereof.

10 Claims, 8 Drawing Sheets

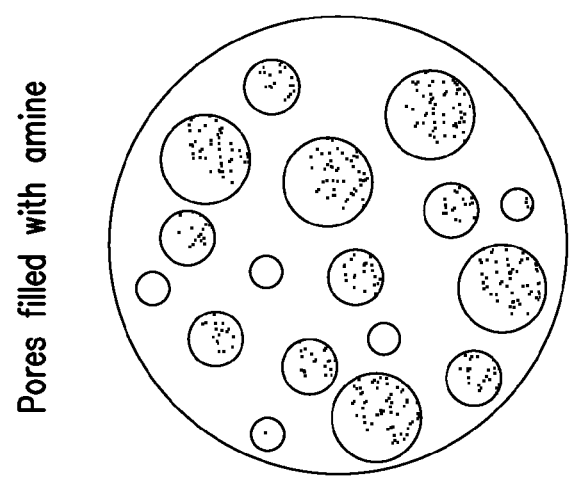
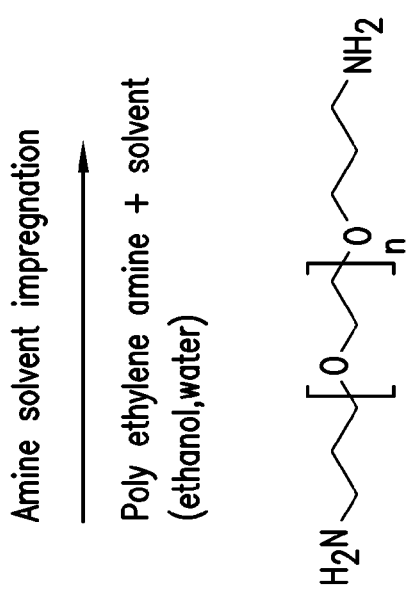
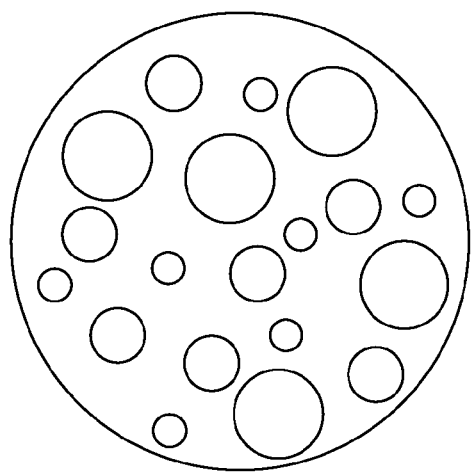
FIG. 4

FUNCTIONALIZED CARBONS FOR LITHIUM-SULFUR BATTERIES

INCORPORATION BY REFERENCE

All references, including publications, patent applications and patents cited herein are hereby incorporated by reference in their entireties to the extent allowable to the same extent as if each reference was individually and specifically indicate to be incorporated by reference and was set forth in its entirety.

BACKGROUND

Over the past two decades, energy storage technologies based on lithium-ion batteries have proven successful and found widespread use in applications such as portable electronics and consumer devices. Sulfur is a promising cathode material with a high theoretical capacity of 1673 mA h/g based on the electrochemical reaction: $S_8 + 16Li \rightleftharpoons 8Li_2S$. An alternative cathode material is fully-lithiated sulfur, $Li_2S$, with a theoretical capacity or 1166 mA h/g. Because the cathode provides a source of lithium, it can be paired with high-capacity lithium metal-free anodes (such as silicon or tin), which avoids dendrite formation and safety concerns associated with metallic lithium anodes.

The polysulfide shuttling reaction between sulfur and its lithiated compounds has limited the development of batteries based on the Li—S chemistry because the reaction leads to irreversible material losses in the battery that reduces energy storage capacity over time. Shuttling is a cyclic process in which long-chain lithium polysulfides, ($Li_2S_n$, $2<n<8$), generated at the cathode during charging, dissolve into the electrolyte and migrate to the anode by diffusion where they react with the lithium electrode in a parasitic fashion to generate lower-order polysulfides, which diffuse back to the sulfur cathode and regenerate the higher forms of polysulfide. Since this polysulfide shuttling or dissolution takes place at the expense of the available electroactive sulfur species, the reversibility of sulfur and/or sulfide is broadly considered a major technical barrier towards commercialization of high-energy Li—S batteries.

Additives like metal oxides ($SiO_2$, $TiO_2$, $Al_2O_3$ etc.) and binders that possess strong Li—O interaction such as poly(vinylpyrrolidine) have been used in cathodes to address battery stability. However, the addition of metal oxides non-electroactive metal oxide add to the volume of the electrode and can reduce energy density. In addition, due to its insulating nature, metal oxide additives can be detrimental to high rate performance.

Another limitation is elemental sulfur is a poor electrical conductor (with a Conductivity$\approx 5 \times 10^{-30}$ S cm$^{-1}$ at 25° C.), which has limited the rate at which a conventional Li—S battery can be discharged/charged. To address the inherent low conductivity of sulfur, electronically conductive additives, such as conductive carbon, can be added to the cathode composition.

There remains a need for sulfur-containing cathode materials for lithium secondary cell with improved conductivity and cycle life.

SUMMARY

Functionalized carbon hosts for use within a cathode of a Li—S battery are provided. The functionalized carbon hosts assist in the sequestering of polysulfides in the cathode that are formed during discharge.

In one aspect, a functionalized carbon includes a porous carbon support, a functional group having affinity for polysulfides and a tether linking the functional group to the carbon support. The functionalized carbon hosts are used to sequester polysulfides in a sulfur-carbon composite material. In other embodiments, the functionalized carbon is used as an electronically conductive additive that is able to sequester polysulfides.

In another aspect, a solution infused porous carbon includes a porous carbon support and a solution of a molecule including a functional group having affinity for polysulfides (a "functional solution") that resides in or is immobilized in the pore volume of the porous host. The solution infused carbon hosts are used to sequester polysulfides in a sulfur-carbon composite material. In other embodiments, the functionalized carbon is used as an electronically conductive additive that is able to sequester polysulfides.

In another aspect, a composite particulate composition is provided having a porous carbon support and a molecule including a functional group having affinity for polysulfides (a "functional molecule") that is in contact with or coats at least a portion of a surface of the porous host. The composite particulate composition are used to sequester polysulfides in a sulfur-carbon composite material. In other embodiments, the composite particulate composition is used as an electronically conductive additive that is able to sequester polysulfides.

In one aspect, a functionalized porous carbon particle includes a porous carbon particle linked to a functional group having affinity for a polysulfide.

In one or more embodiments, the functional group is a Lewis base.

In any of the preceding embodiments, the functional group is selected from the group consisting of esters, amides, ketones, imines amines, nitriles, pyridines, ethers, thioethers, organophosphines, electron rich π-system Lewis bases, such as ethyne, ethene, and benzene.

In any of the preceding embodiments, the functional group is an amine.

In any of the preceding embodiments, the functional group is linked to the porous particle with a linker having a spacer of three or less atoms.

In any of the preceding embodiments, the functional group and linker together form a polyimine or polyamine.

In any of the preceding embodiments, the carbon particle is an activated carbon.

In any of the preceding embodiments, the carbon particle is an mesoporous carbon.

In any of the preceding embodiments, the composite particle includes sulfur and the sulfur located within the carbon pores or decorated on the outer surface of carbon particles.

In another aspect, a positive electrode includes a functionalized porous carbon particle according to any of the preceding embodiments; and sulfur.

In any of the preceding embodiments, the positive electrode further includes a binder.

In any of the preceding embodiments, the positive electrode further includes a conductive carbon additive.

In any of the preceding embodiments, the positive electrode further includes a functional molecule that has an affinity for polysulfides.

In another aspect, a porous solvent infused carbon particle includes a porous carbon particle having a pore volume and a solution having a functional molecule contained within the pore volume of porous carbon particle, the functional molecule having a functional group having affinity for a polysulfide.

In any of the preceding embodiments, the functional group is a Lewis base.

In any of the preceding embodiments, the functional group is selected from the group consisting of esters, amides, ketones, imines amines, nitriles, pyridines, ethers, thioethers, organophosphines, electron rich π-system Lewis bases, such as ethyne, ethene, and benzene.

In any of the preceding embodiments, the functional molecule is an amine.

In any of the preceding embodiments, the functional molecule a polyamine.

In any of the preceding embodiments, the particle is a carbon particle.

In any of the preceding embodiments, the carbon particle is an activated carbon.

In any of the preceding embodiments, the carbon particle is an mesoporous carbon.

In any of the preceding embodiments, wherein the porous solvent infused carbon particle further includes sulfur and the sulfur decorated on the outer surface of carbon particles.

In another aspect, a positive electrode includes a porous solvent infused carbon particle according to any of the preceding embodiments and sulfur.

The conductive carbon additive surface is decorated with polysulfide reservoirs. Use of such carbon additives can improves the sulfur utilization of a Li—S battery by effectively absorbing the soluble intermediate polysulfides at the cathode and releasing them at the end of the discharge process.

BRIEF DESCRIPTION OF THE DRAWING

The invention is described with reference to the following figures, which are presented for the purpose of illustration only and are not intended to be limiting. In the Drawings:

FIG. 4 is a schematic illustration of a method of making a functionalized carbon support according to one or more embodiments.

DETAILED DESCRIPTION

Figure 1:
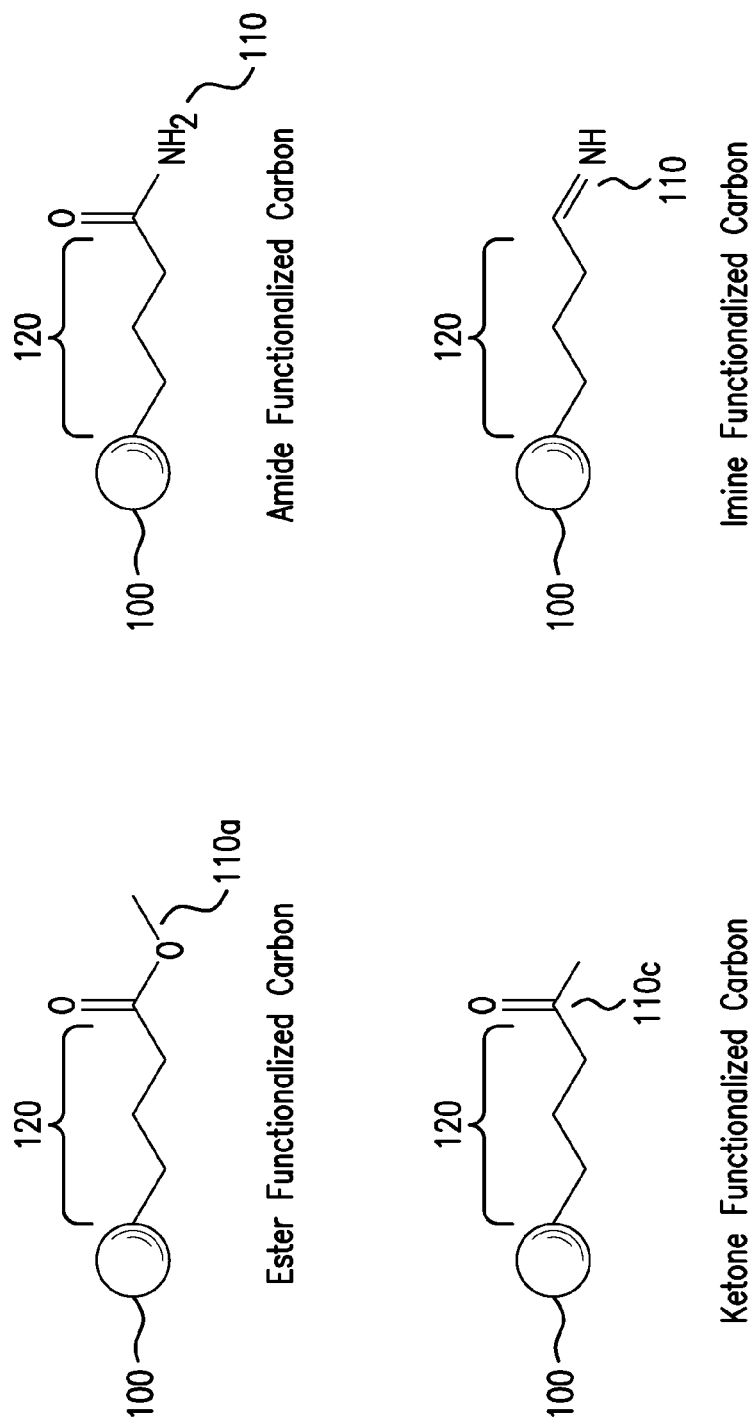
FIG. 1 is a schematic illustration of a series of functionalized porous host supports according to one or more embodiments.

Chemical processes in the Li—S cell include lithium dissolution from the anode surface (and incorporation into alkali metal polysulfide salts) during discharge, and reverse lithium plating to the anode while charging. This contrasts with conventional lithium-ion cells, where the lithium ions are intercalated in the anode and cathodes. Consequently Li—S allows for a much higher lithium storage density. Polysulfides are reduced on the cathode surface in sequence while the cell is discharging:

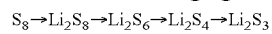
$S_8 \rightarrow Li_2S_8 \rightarrow Li_2S_6 \rightarrow Li_2S_4 \rightarrow Li_2S_3$ Across a porous diffusion separator, sulfur polymers form at the cathode as the cell charges:

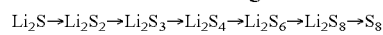
$Li_2S \rightarrow Li_2S_2 \rightarrow Li_2S_3 \rightarrow Li_2S_4 \rightarrow Li_2S_6 \rightarrow Li_2S_8 \rightarrow S_8$ The long-chain lithium polysulfides, ($Li_2S_n$, <n<8), generated at the cathode during charging, are more soluble than elemental sulfur and can dissolve into the electrolyte, where it can shuttle between the anode and the cathode. This polysulfide shuttling reaction reduces available electroactive species. The porous carbon materials and porous carbon composites described herein reduce polysulfide dissolution in the electrolyte and increase and/or improve the effective capacity of the cell.

Functionalized Porous Host

Functionalized carbon for use in a cathode of a lithium-sulfur battery are described. The functionalized carbon can be used as a host to store sulfur in a positive electrode of a lithium-sulfur battery. Described herein are methods for producing functionalized carbon host materials for use as carbon-sulfur composite materials, particularly for use in a lithium-sulfur battery. Also described herein are high-energy density, low-cost rechargeable lithium sulfur batteries including the functionalized carbon host material.

Electronically conductive carbon is typically added to one or both electrodes to increase the conductivity of the electrode. The functionalized carbon can also be used as an electronically conductive additive in a lithium-sulfur battery. In other embodiments, functionalized carbon host materials as a conductive additive for use in a Li—S battery are described.

In one aspect, a functionalized porous host includes a porous support, a functional group having affinity for polysulfides and a tether linking the functional group to the porous support. The functionalized porous hosts are used to sequester polysulfides in the electrode and to prevent its dissolution into the electrolyte. In other embodiments, the porous hosts are combines with sulfur, e.g., elemental sulfur, to form a composite sulfur, e.g., a carbon-sulfur, active material.

The porous host provides a porous structure having functional groups on its outer surface or within its pores or both. The large surface area and porosity of the porous host are beneficial for the homogeneous dispersion of the functional groups. The functional group has an affinity for polysulfides. Thus, as the concentration of polysulfides in the cathode increases during operation of a Li—S electrochemical cell, the affinity of the functional group for the polysulfides prevents or reduces their dissolution and migration into the electrolyte.

Polysulfides can be regarded as weak Lewis acids. Hence, adding Lewis base type functional groups to carbon provides strong interactions with the polysulfides. Exemplary function groups include esters, amides, ketones, imines, amines, nitriles, pyridines, ethers, thioethers, organophosphines, and electron rich π-system Lewis bases, such as ethyne, ethene, and benzene. In certain embodiments, the functional group can be esters or amides or ketones or imines or mixtures thereof.

FIG. 1 provides a schematic illustration of exemplary functionalized porous hosts according to one or more embodiments. The functionalized porous host includes a porous particle 100 and a functional group 110, e.g., groups 110a, 110b, 110c and 110d. The functional group is linked to the porous particle through tether 120, which is shown here as a hydrocarbon linker.

The porous host 100 can be a porous carbon. Any conventional carbon source, in particular those that have been identified as useful as components in carbon-sulfur composites for lithium ion batteries, can be used. Carbon host can be mesoporous, meso/microporous, or microporous carbon. The pore size of the carbon host sequesters the sulfur within the meso/micropores of the porous carbon. The carbonaceous material may be selected from the group consisting of coal, polyacrylonitrile, resorcinol-formaldehyde resins, Ketjen, aerogel, coconut, bamboo, plant derived, CNT, graphene, acetylene black, Super P and a combination thereof. In certain embodiments, the porous carbon host can have a surface area 500 to 3000 $m^2/g$ and/or a pore volume 0.2 to 3 $cm^3/g$ and/or a pore size 0.5 nm to 10 nm.

Functional group 110 is a chemical group that has affinity for polysulfides. Such affinity can be binding affinity or electrostatic attraction (having positive charged species). For example, positively charged species that can interact with the negatively charged intermediates polysulfide species can be used. A wide range of chemical moieties can be used for this purpose. Exemplary groups include esters, amides, ketones, imines, amines, nitriles, pyridines, ethers, thioethers, organophosphines, and electron rich π-system Lewis bases, such as ethyne, ethene, and benzene. In FIG. 1 provides several exemplary functional groups such as esters 110a or amides 110b or ketones 110c or imines 110d or mixtures thereof. The functional group can be attached to the carbon host using a variety of bonds. For example, the functional group can be covalently linked to the carbon host. In other embodiments, the functional group can be ionically linked to the carbon host. In other embodiments, the functional group can be electrostatically linked to the carbon host.

In another embodiment, the functional group is an organic silane having the formula R'—Si—(OR)$_3$ with an organic functional group (R') and three alkoxy groups (OR). The chemical reaction begins with the hydrolysis of the alkoxy groups into silanols (SiOH) that may condense forming siloxane bonds. The functional group R is capable of interacting with polysulfides or forms chemical reversible bonds.

In one embodiment, the functional group is linked to the carbon host through a linker or tether. The linker can be bifunctional or multifunctional and have groups that are capable interacting with the carbon host at one end and the functional group at the other end. The linker may have bifunctional or multifunctional features capable of covalent, ionic and electrostatic linkage between the carbon host and the functional group. In one embodiment, the linker provide covalent linkage. The linker can be a hydrocarbon, ethylene glycol or polyethylene glycol, by way of example.

The linker attaches the functional group to carbon. Shorter linkers, e.g., C3 (or other comparable atom) or less, can be effective inside the carbon pores. Longer linkers may be effective on the surface of the carbon, where the longer alkyl chain length (greater than propyl) can help to avoid steric hindrance between neighboring functional groups tethered on the carbon host surface. The longer linkers also increases the grafting density of the functional groups.

In one embodiments, the functional groups are located at the terminus of the linker or tether 120. In other embodiments, one or more functional groups are located along the length of the linker. In one or more embodiments, a plurality of functional groups are located along the length of the linker, e.g., as groups attached pendantly along the linker length, and at the linker terminus. By way of example, the linker and functional group can form repeating units in a linear or branched pendant from the carbon host. The combined linker/functional group can be polyamines, e.g., ethylene diamine, 1,3-diaminopropane, hexamethylenediamine, putriscine, spermidine, spermine, or a polyamine having repeating unit composed of the amine group and two or more carbon aliphatic spacer to produce an amine functionalized carbon, or polyamides or polyesters. See, FIG. 2A.

Figure 2:
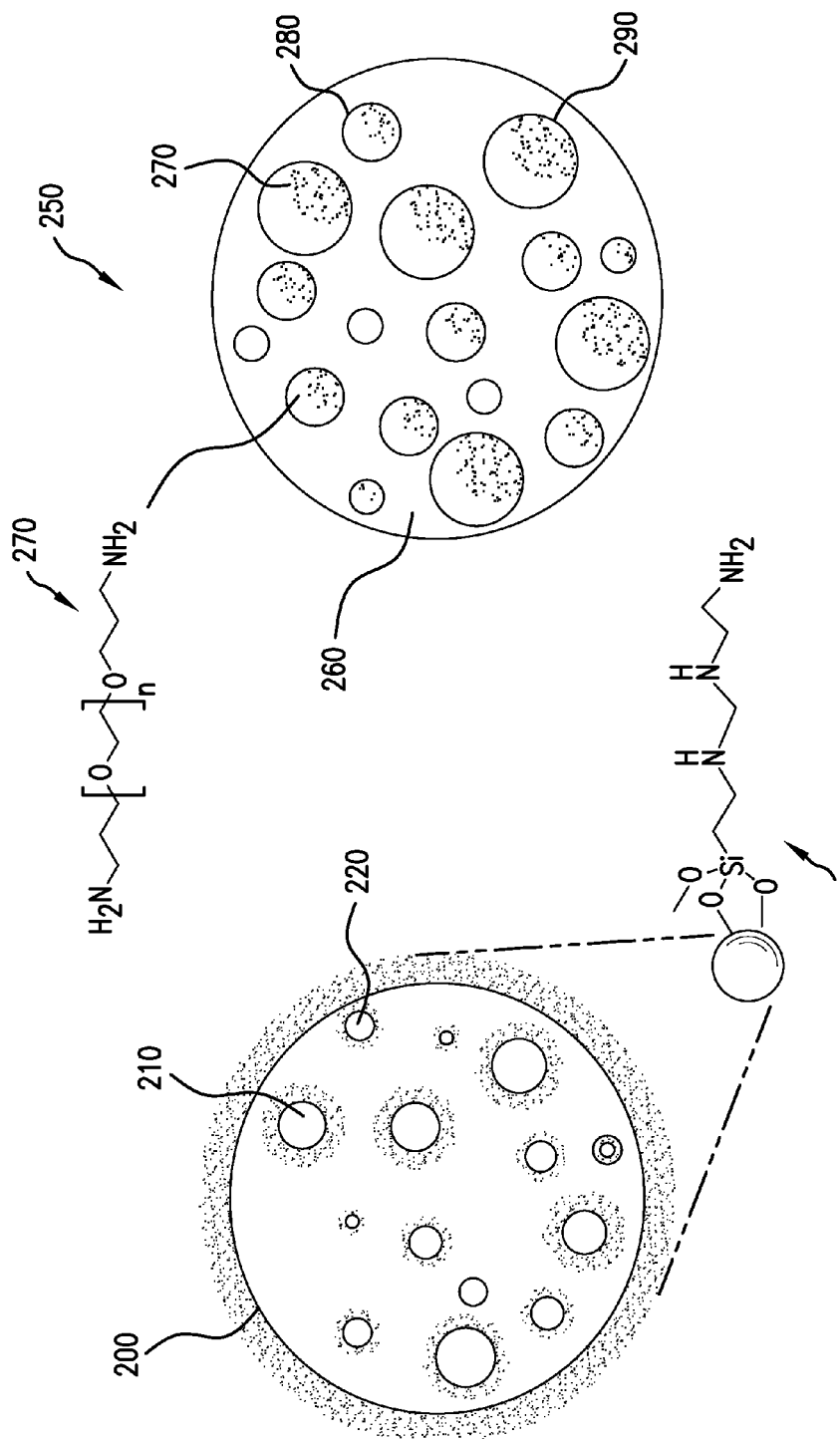
FIG. 2 is a schematic illustration of a (A) functionalized porous host and (B) solvent infused porous host according to one or more embodiments.

FIG. 2A is a schematic illustration of a functionalized porous host, illustrating the presence of the functional group on the outer surface and porous interior of the porous host particle according to one embodiment. The functionalized host includes a porous particle 200 having micropores 210 and mesopores 220. The walls of the pores and the particle outer surface contains a functional layer 230 that includes a functional group linked to the porous host through a linker. As exemplified in FIG. 2A, the linked functionality is a polyethylene amine. The pore interiors are not filled, providing space for the sulfur active material. While shown here as a layer that covers most or all of the particle outer surface and inner pore surface, in practice, the functional group can cover all or a portion of the particle. It can be substantially on the surface or substantially in the interior pore surfaces, or on both. It can cover 100%, 95%, 90%, 85%, 80%, 75%, 70%, 65%, 60%, 55%, 50%, 45%, 40%, 35%, 30%, 25% or less of the total surface area of the particle. In certain embodiments, the functional group provides 5-15% coverage.

In other embodiments, the carbon that is used as a conductive additive can be functionalized to reduce polysulfide dissolution into the electrolyte. Exemplary carbon includes KetJen black (electro-conductive carbon black), Aerogel carbon, Coconut shell derived carbon, Carbon nanotubes (CNTs), Graphene, Acetylene black, Super P carbon etc. Carbon black is a form of paracrystalline carbon that has a high surface-area-to-volume ratio. Carbon aerogels are composed of nanoparticles of carbon with diameters approximately 1-2 nm. Like other aerogels, carbon aerogels are primarily mesoporous with a mean pore diameter of approximately 7-10 nm typical. Most carbon aerogels have a surface area ranging from 500-800 $m^2/g$, however this is highly dependent on density and other properties. Acetylene black is a form of carbon black formed by the decomposition (but not by the burning) of acetylene. It is characterized by its high degree of crystalline orientation compared with other sources of carbon black. Conductive carbons produced from coconut shells typically have a tighter, more microporous pore structure than their coal-based counterparts. Graphene can be described as a one-atom thick layer of the layered mineral graphite. High quality graphene is very strong, light, nearly transparent, an excellent conductor of heat and electricity. Its interaction with other materials and with light, and its inherently two-dimensional nature, produce unique properties. The conductive carbon can be functionalized as described above for the porous host carbon. The lower surface area and smaller pore size means that the surface of the carbon (as compared to the porous interior) is predominantly functionalized.

The functionalized porous host can be prepared using a variety of methods, and conventional methods for introducing functionalizing carbon surfaces can be adapted to this purpose.

Figure 3:
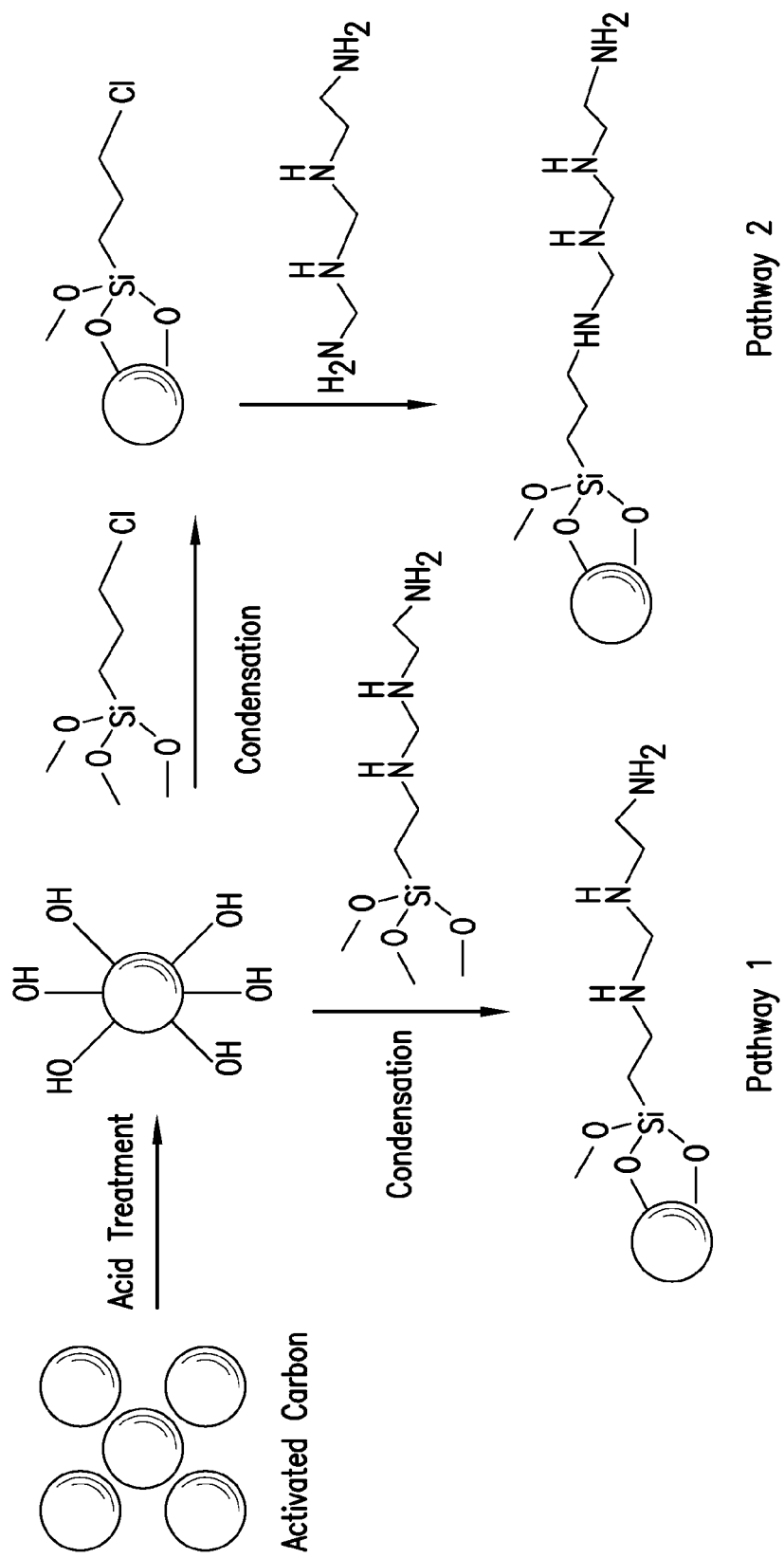
FIG. 3 is a schematic illustration of a method of making a functionalized carbon support according to one or more embodiments.

An exemplary method of making a functionalized carbon host is shown in FIG. 3. In certain embodiments, randomly porous materials can be used. In other embodiments, mesoporous carbon materials with extremely high surface areas and ordered mesostructures can be used. An exemplary starting material can be a conductive microporous or mesoporous carbon such as activated carbon. These materials are generally microporous in nature, but may have pore diameters that extend into the mesoporous range. Activated carbon materials are commonly manufactured in two steps. The first step involves the pyrolysis of a carbonaceous source such as wood or coal under an inert atmosphere at high temperature. The second step activates, or oxidizes the carbon surface under a flow of a mild oxidizing agent such as $CO_2$ or $O_2$. The carbon particles can be pretreated, for example by oxone exposure, acid treatment or other oxidation process, to provide reactive hydroxyl groups on the surface and within accessible pore. Acid treatment can include an oxidizing agent such as but not limited to nitric acid or concentrated sulfuric acid. The pretreated carbon is then reacted with a linker such as a functionalized trialkoxy silane. The trialkoxy silane can provide the linker feature for connecting and spacing apart the functional group and the carbon substrate. In one embodiment, the trialkoxysilane can include an alkylchloride group, as shown in pathway 2 of FIG. 3. The alkyl chloride group can be further reacted to provide the desired functional group, as exemplified by the reaction with a polyamine, e.g., ethylene diamine, 1,3-diaminopropane, hexamethylenediamine, putriscine, spermidine, spermine, or a polyamine having repeating unit composed of the amine group and two or more carbon aliphatic spacer to produce an amine functionalized carbon. In another embodiment, the trialkoxysilane can include a functionalized group that can be directly linked to the carbon substrate as shown pathway 1.

Solvent Infused Porous Host

In another aspect, the functional group can be introduced into the pore volume of the porous host by being dissolved or suspended in a carrier liquid and introducing the carrier liquid into the pore volume of the host. A solvent infused porous host includes a porous support having a pore volume and a solution or suspension of a molecule including a functional group having affinity for polysulfides (a "functional solution") that resides in or is immobilized in the pore volume of the porous host. The solvent infused hosts are used to sequester polysulfides in the electrode and to prevent its dissolution into the electrolyte.

The porous host provides a pore volume capable of retaining or immobilizing a functional solution within its pore volume. The large surface area and porosity of the porous host are beneficial for the homogeneous dispersion of the functional solution. The functional group has an affinity for polysulfides. Thus, as the concentration of polysulfides in the cathode increases during operation of a lithium-sulfur electrochemical cell, the affinity of the functional group (located on the functional molecule in the functional liquid carrier) for the polysulfides prevents or reduces their dissolution and migration into the electrolyte.

As noted above, polysulfides can be regarded as weak Lewis acids. Hence, solutions that include molecules having Lewis base type functional groups provides strong interactions with the polysulfides. Exemplary function groups include esters, amides, ketones, imines, amines, nitriles, pyridines, ethers, thioethers, organophosphines, and electron rich π-system Lewis bases, such as ethyne, ethene, and benzene. In certain embodiments, the functional group can be esters or amides or ketones or imines or mixtures thereof. The functional molecule can be a polyamine, e.g., ethylene diamine, 1,3-diaminopropane, hexamethylenediamine, putriscine, spermidine, spermine, or a polyamine having repeating unit composed of the amine group and two or more carbon aliphatic spacer to produce an amine functionalized carbon. In other embodiments, the functional molecule can be end-functionalized with a group having affinity for polysulfides and the molecule can be a linear or branched hydrocarbon, or a polyglycol.

FIG. 2B provides a schematic illustration of exemplary solvent infused porous hosts according to one or more embodiments. The functionalized porous host 250 includes a porous particle 260 having micropores 270 and mesopores 280. The porous host 250 can be a porous carbon. Any conventional carbon source, in particular those that have been identified as useful as components in carbon-sulfur composites for lithium ion batteries, can be used. Carbon host can be mesoporous, meso/microporous, or microporous carbon. The pore size of the carbon host sequesters the sulfur within the meso/micropores of the porous carbon. The carbonaceous material may be selected from the group consisting of coal, polyacrylonitrile, resorcinol-formaldehyde resins, Ketjen, aerogel, coconut, bamboo, plant derived, CNT, graphene, acetylene black, Super P and a combination thereof. In certain embodiments, the porous carbon host can have a surface area 500 to 3000 $m^2/g$ and/or a pore volume 0.2 to 3 $cm^3/g$ and/or a pore size 0.5 nm to 10 nm. The pores of the particle contains a functional solution 290 that includes a molecule including a functional group having affinity for polysulfides. As illustrated in FIG. 2B, the functional molecule is a poly (oxyethylene) amine or poly ethylene amine or poly aziridine or combination of them. The polymers can be linear, branched or dendrimer in nature. While shown here as a liquid that fills most or all of the particle inner pore volume, in practice, the functional solution can fill all or a portion of the particle pore volume. It can fill 100%, 95%, 90%, 85%, 80%, 75%, 70%, 65%, 60%, 55%, 50%, 45%, 40%, 35%, 30%, 25% or less of the total inner pore volume of the particle. In certain embodiments, the functional group provides 5-15% coverage.

In other embodiments, the carbon that is used as a conductive additive can be functionalized to reduce polysulfide dissolution into the electrolyte. Exemplary carbon includes KetJen black (electro-conductive carbon black), Aerogel carbon, Coconut shell derived carbon, Carbon nanotubes (CNTs), Graphene, Acetylene black, Super P carbon etc. The conductive carbon can be infused with solvent as described above for the porous host carbon. The lower surface area and smaller pore size means that the pore volume occupied by the functional solution is smaller.

The solvent infused porous host can be prepared using a variety of methods, and conventional methods for functionalizing carbon surfaces can be adapted to this purpose.

An exemplary method of making a solvent infused carbon host is shown in FIG. 4. In certain embodiments, randomly porous materials can be used. In other embodiments, mesoporous carbon materials with extremely high surface areas and ordered mesostructures can be used. An exemplary starting material can be a conductive microporous or mesoporous carbon such as activated carbon. These materials are generally microporous in nature, but may have pore diameters that extend into the mesoporous range.

A solution of the functional molecule is infused into the pores of the porous host. Solvent is selected to be electrochemically inert under the operating conditions of the lithium-sulfur battery and to have solubility for the functional molecule. In one or more embodiments, it can be the same solvent as is used for the electrolyte. Exemplary solvents include ethers, carbonates, glymes, ionic liquids or combination of them.

In another embodiment, the solvent is evaporated after infusion the functional molecule, that interacts with the PS, into the carbon host pores.

Carbon-Functional Molecule Composite

It has been surprisingly discovered that the functional molecule can be effective to improve the performance of a lithium sulfur battery even without tethering or infusing as described hereinabove. The functional molecule, that is a molecule having a functional group that has affinity for polysulfides, can be mixed with carbon. The functional molecule can coat or decorate the surface of the porous carbon, or the functional molecule can occupy space between porous carbon particles. The porous carbon can be a porous carbon host that includes sulfur within its pores, or it can be a conductive carbon additive, or both.

In another embodiment, the functional group is an organic silane having the formula $R'-Si-(OR)_3$ with an organic functional group ($R'$) and three alkoxy groups (OR). The chemical reaction begins with the hydrolysis of the alkoxy groups into silanols (SiOH) that may condense forming siloxane bonds. The functional group R is capable of interacting with polysulfides or forms chemical reversible bonds.

As noted above, polysulfides can be regarded as weak Lewis acids. Hence, molecules having Lewis base type functional groups provides strong interactions with the polysulfides. Exemplary function groups include esters, amides, ketones, imines, amines, nitriles, pyridines, ethers, thioethers, organophosphines, and electron rich π-system Lewis bases, such as ethyne, ethene, and benzene. In certain embodiments, the functional group can be esters or amides or ketones or imines or mixtures thereof. The functional molecule can be a polyamine, e.g., ethylene diamine, 1,3-diaminopropane, hexamethylenediamine, putriscine, spermidine, spermine, or a polyamine having repeating unit composed of the amine group and two or more carbon aliphatic spacer to produce an amine functionalized carbon. In other embodiments, the functional molecule can be end-functionalized with a group having affinity for polysulfides and the molecule can be a linear or branched hydrocarbon, or a polyglycol.

Any conventional carbon source, in particular those that have been identified as useful as components in carbon-sulfur composites for lithium ion batteries, can be used. Carbon host can be mesoporous, meso/microporous, or microporous carbon. The pore size of the carbon host sequesters the sulfur within the meso/micropores of the porous carbon. The carbonaceous material may be selected from the group consisting of coal, polyacrylonitrile, resorcinol-formaldehyde resins, Ketjen, aerogel, coconut, bamboo, plant derived, CNT, graphene, acetylene black, Super P and a combination thereof. In certain embodiments, the porous carbon host can have a surface area 500 to 3000 $m^2/g$ and/or a pore volume 0.2 to 3 $cm^3/g$ and/or a pore size 0.5 nm to 10 nm.

The carbon-functional molecule composite can be formed using any conventional method used or combining particles with a molecular component. Exemplary methods include slurrying of carbon particles in a solution or suspension containing the functional molecule, followed by solvent removal or drying.

Sulfur Carbon Composite

In one or more embodiments, sulfur is combined with the porous carbon structures described herein to provide carbon-sulfur materials capable of sequestering polysulfides. Sulfur can be incorporated into or combined with the functionalized porous hosts or solvent infused porous hosts or carbon-functional molecule composites to form the sulfur carbon composites.

In one or more embodiments, the composite is formed by introducing sulfur into the pore space of a functionalized carbon host. Sulfur, a low melting and high vapor pressure solid, can be introduced into the porous carbon pore volume in a variety of ways. In some embodiments, a sulfur-carbon composite is attained by mechanical mixing of the carbon and sulfur, by low temperature melt impregnation (165° C.) of a molten sulfur into the porous carbon host, by high temperature vapor phase infusion (<400° C.) of sulfur vapor into the porous carbon host or by solvent infusion. In some embodiments, the sulfur loading ranges between 5 and 95% (of total weight), or preferably between 50 and 70% (of total weight). Suitable methods for incorporating sulfur into a carbon-sulfur composite is described in co-pending U.S. Provisional application Ser. No. 61/872,300, filed Aug. 30, 2013, which is incorporated in its entirety by reference.

Incorporation into a Li—S Battery

The positive electrode exhibits high sulfur utilization and high average voltage. The positive electrode includes the functionalized porous host, a positive active material, and optionally a binder, and an electronically conductive additive. The positive active material (sulfur) can be infused or absorbed into the functionalized porous host or solvent infused porous host according to one or more embodiments as described herein above. In other embodiments, the sulfur can be added separately to the positive electrode composition and an intimate mixture of the components is formed. The binder may be polyvinyl pyrrolidone, poly(methyl methacrylate), a copolymer of polyhexafluoropropylene and polyvinylidene fluoride, polyethyl acrylate, polyvinyl chloride, polyacrylonitrile, polycaprolactam, polyethylene terephthalate, polybutadiene, polyisoprene, polyacrylic acid, derivatives thereof, blends thereof, or copolymers thereof. In some embodiments, the binder also has affinity for polysulfides to further contribute to the sequestration of polysulfides in the cathode.

The positive electrode can also include additional conductive additives that can function as an electrical conductor that facilitates the movement of electrons within the positive electrode with the sulfur-based compound. Examples of conductive material for the electrical conductor include, but are not limited to, for example, a graphite-based material, a carbon-based material and a conductive polymer. The graphite based material includes KS 6 (available from TIMCAL CO.), and the carbon-based material includes SUPER P (available from MMA Co.), ketjen black, denca black, acetylene black, or carbon black. Exemplary conductive polymers include polyaniline, polythiophene, polyacetylene, or polypyrrol, or a combination thereof.

The positive electrode includes 30% by weight of the functionalized carbon host based on 100 parts by weight of the total of cathode active material and binder. Carbon content in the cathode is in the range 10 to 70% by weight.

The affinity of the functional group for the polysulfides prevents or reduces their dissolution and migration into the electrolyte. The positive electrode includes 10% by weight of the polymer binder based on 100 parts by weight of the total of cathode active material and binder. Polymer binder content in the cathode is in the range 2 to 20% by weight.

A positive electrode preparation can be prepared by dissolving a binder in a solvent to prepare a binder liquid. Any solvent may be used, wherein the solvent is capable of homogeneously dispersing a positive active material, the binder, and a conductor. Useful solvents include methanol, ethanol, propanol, butanol, tetrahydrofurane, water, isopropyl alcohol, and N-methyl pyrrolidone. A functionalized carbon host and the positive active material are added to the binder mixing liquid. The resulting positive active material composition is coated on a current collector and dried to produce a positive electrode. The current collector is not limited to, but is preferably made of, a conductive material, for example, carbon, stainless steel, aluminum, copper, or titanium.

The negative electrode 12 includes a negative active material selected from materials in which lithium intercalation reversibly occurs, a material which reacts with lithium ions to form a lithium-containing compound, a lithium metal or a lithium alloy. The materials in which lithium intercalation reversibly occurs are carbon-based compounds. Any carbon-based compound capable of intercalating and deintercalating lithium ions may be used. Examples of suitable carbon material include crystalline carbon, amorphous carbon, or a mixture thereof.

The electrolyte includes an electrolytic salt and an organic solvent. The organic solvent may be a sole solvent or a mixed organic solvent with at least two components. The mixed organic solvent includes at least two groups selected from a weak polar solvent group, a strong polar solvent group, or a lithium protection group. Some electrolytes include at least one or more solvents selected from the same group.

The invention is illustrated by the following examples, which are provided for the purpose of illustration and are not intended to limit the invention.

Example. Preparation and Testing of a Li—S Battery Having a Functional Molecule in the Positive Electrode A series of cathodes were prepared using 50% sulfur+20% Super-P carbon+20% Carbon black+10% PVDF and 2%, 6.25% and 11.5% (all by weight) of (3-trimethoxysilylpropyl) diethylene triamine (SIT8398.0). The components were mechanically mixed with NMP solvent to distribute and intermix the components and the electrodes was cast on Al current collector and dried. The electrolyte included 0.1M LiTFSI+0.2M $LiNO_3$ in DOL(,3-dioxolane)/DME (dimethoxy ethane) (v:v=1:1), and the anode was lithium.

Figure 5:
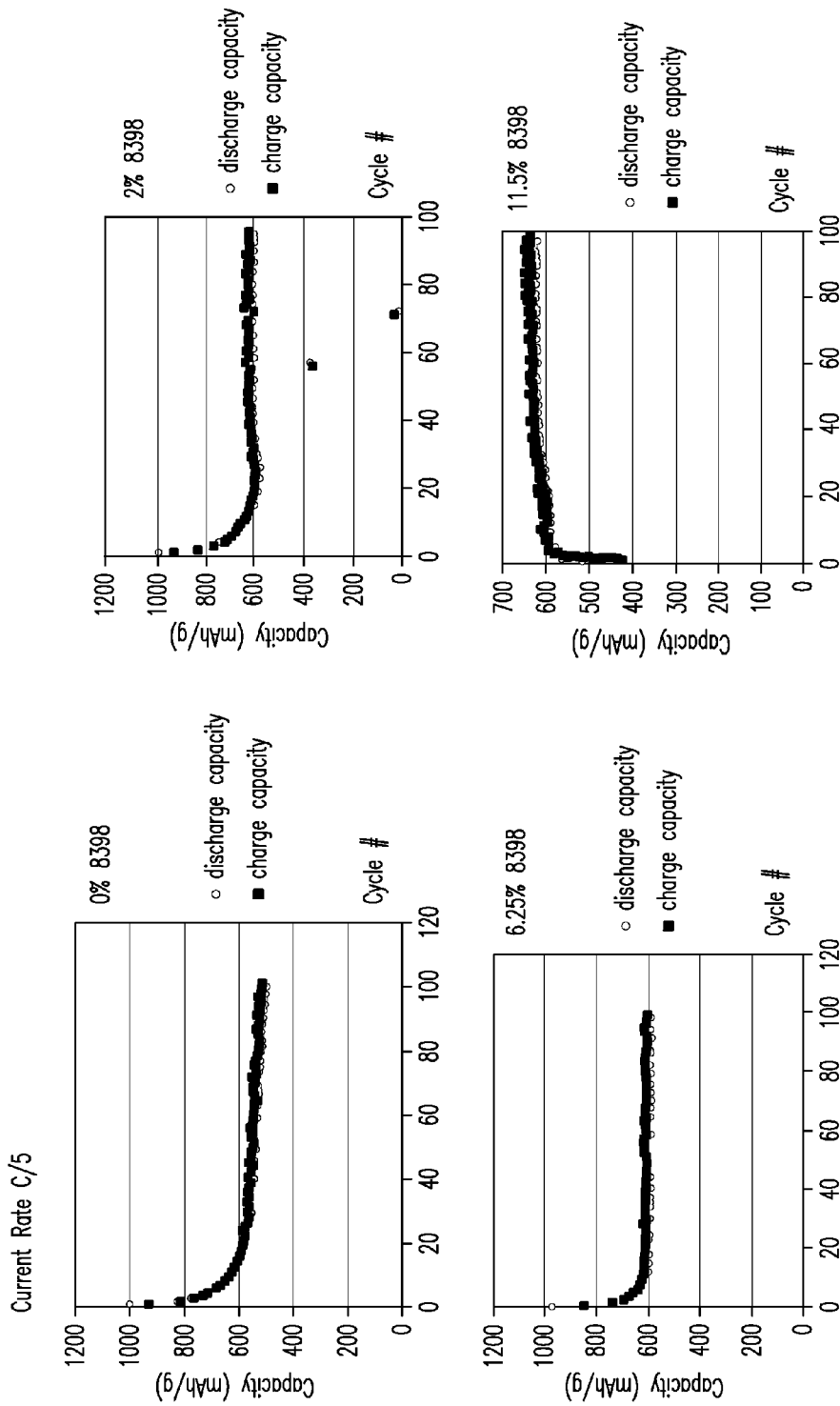
FIG. 5 is a series of plots showing capacity with cycle number for cells charged and discharged at C/5, including 0%, 2%, 6.25% and 11.5% by weight (3-trimethoxysilylpropyl) diethylene triamine (8398) in the cathode.
Figure 6:
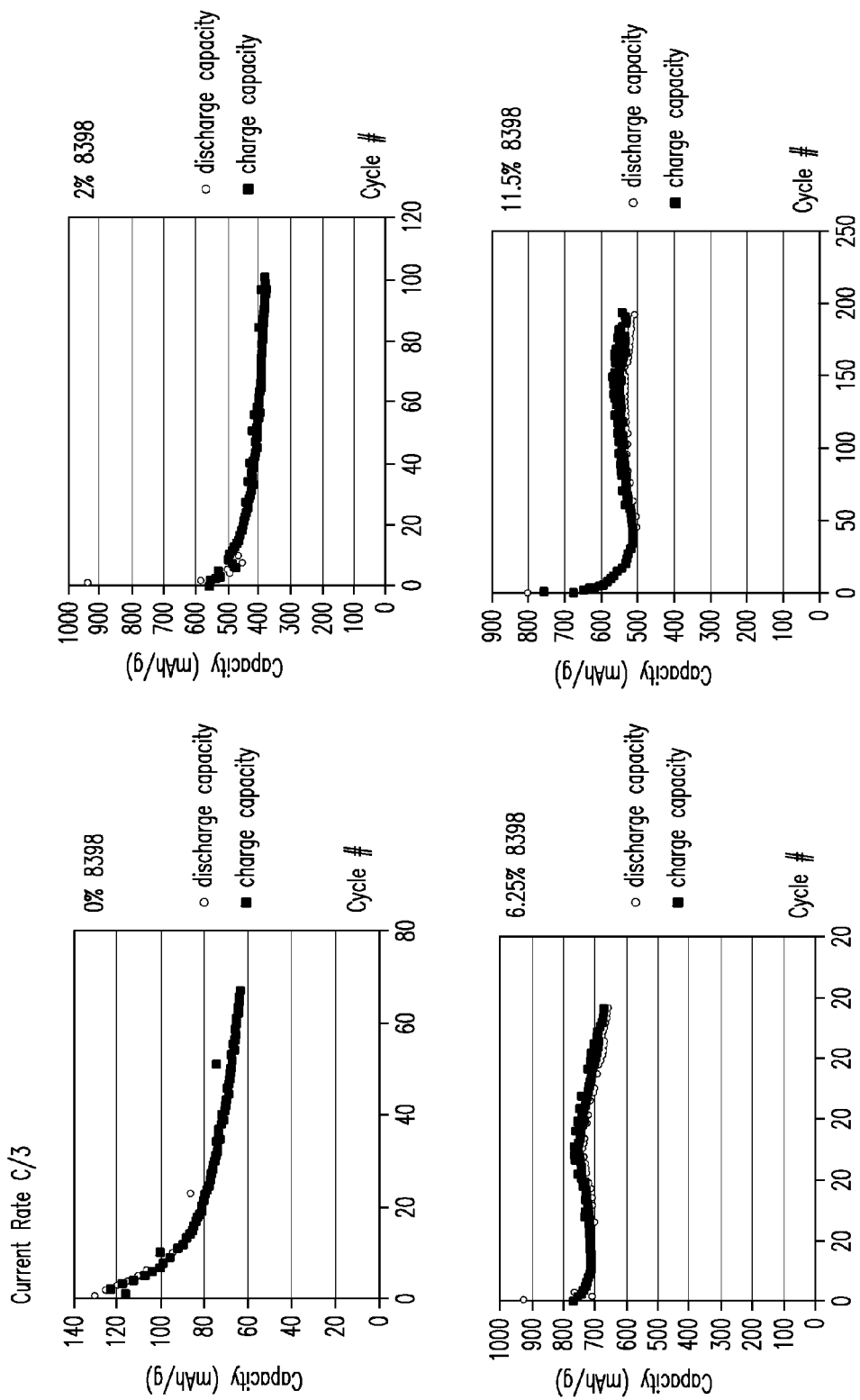
FIG. 6 is a series of plots showing capacity with cycle number for cells charged and discharged at C/3, including 0%, 2%, 6.25% and 11.5% by weight (3-trimethoxysilylpropyl) diethylene triamine (8398) with cycle number for cells charged and discharged at C/5, including 0%, 2%, 6.25% and 11.5% by weight in the cathode.
Figure 7:
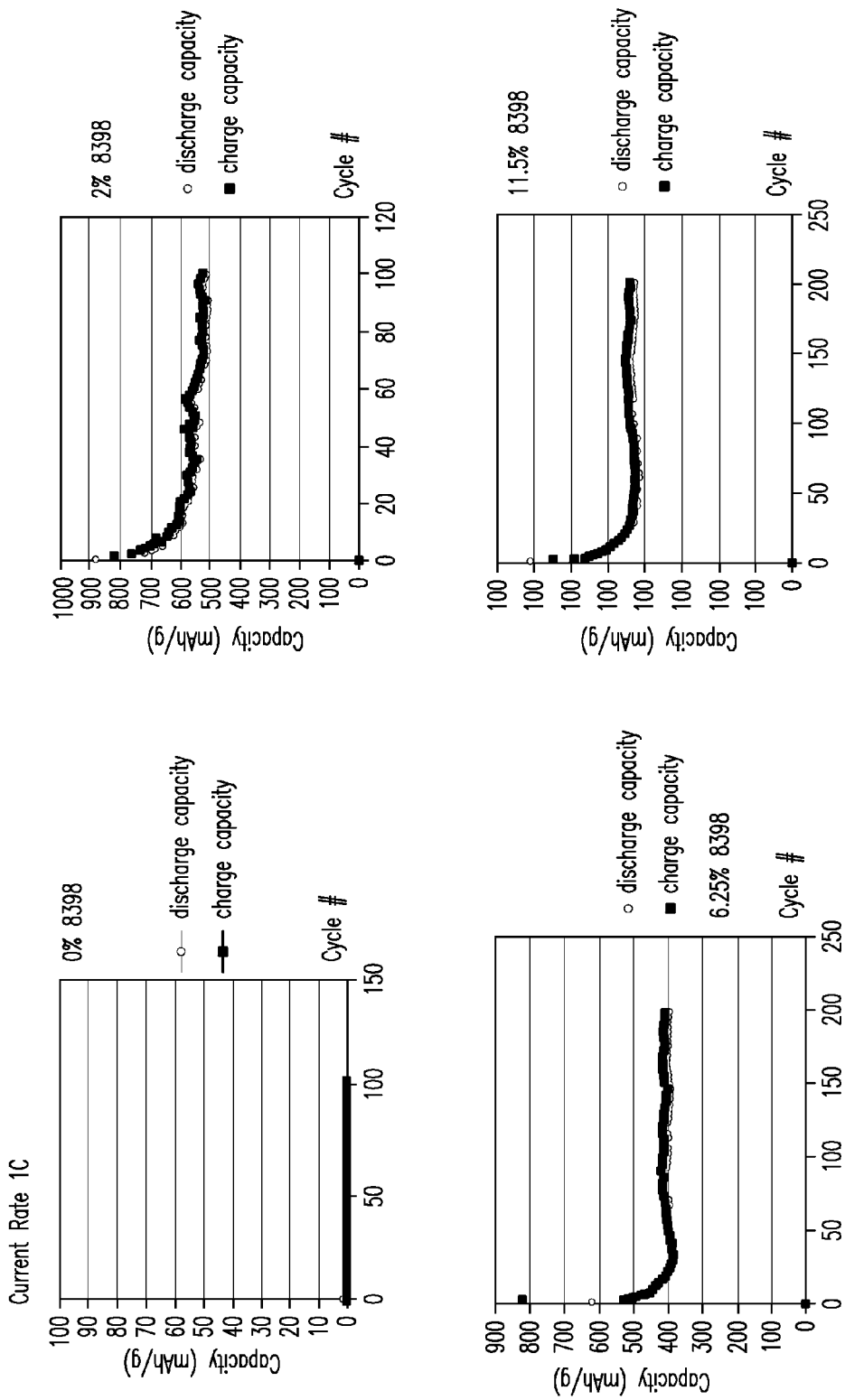
FIG. 7 is a series of plots showing capacity with cycle number for cells charged and discharged at 1C, including 0%, 2%, 6.25% and 11.5% by weight (3-trimethoxysilylpropyl) diethylene triamine (8398) in the cathode.

The cells were then cycled for 80-200 cycles at C/5, C/3 and 1C. The capacity fade for cells having 0%, 2%, 6.25% and 11.5% SIT8398 at each rate is reported in FIGS. 5-7, for C/5, C/3 and 1C, respectively. This is a direct consequence of effectively sequestering the generated poly sulfides within the cathode. Amine functional molecule chemically interacts with the PS and avoids dissolution and diffusion of PS into electrolyte.

Figure 8:
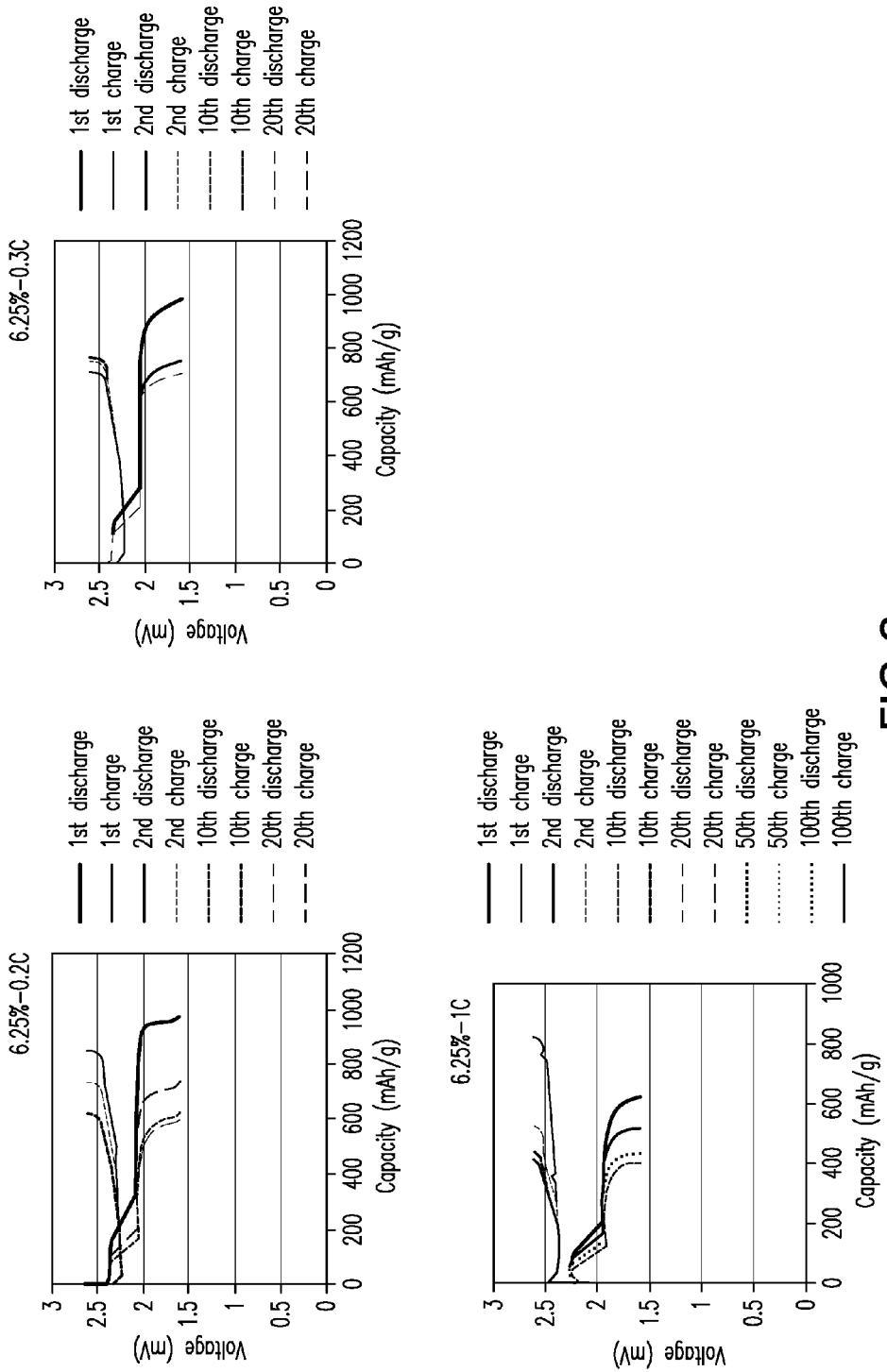
FIG. 8 reports the charge and discharge curves for the first, second, tenth, twentieth charge/discharge cycles at C/5, C/3 and 1C (and $50^{th}$ and $100^{th}$ for cells cycled at 1C) for the cells including 0%, 2%, 6.25% and 11.5% by weight (3-trimethoxysilylpropyl) diethylene triamine (8398) in the cathode.

FIG. 8 reports the charge and discharge curves for the first, second, tenth, twentieth charge/discharge cycles at C/5, C/3 and 1C for the cells containing 6.25% 8389 (and $50^{th}$ and $100^{th}$ for cells cycled at 1C). Addition of functional molecule improves the sulfur utilization (as assessed by capacity mAh/g). This is a direct consequence of effectively sequestering the generated poly sulfides within the cathode. Amine functional molecule chemically interacts with the PS and avoids dissolution and diffusion of PS into electrolyte.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

What is claimed is:

1. A functionalized porous carbon particle comprising:
   a porous carbon particle linked by an organosiloxy group to a functional group having affinity for a polysulfide, wherein the carbon particle comprises elemental sulfur located within the carbon pores or decorated on the outer surface of the carbon particle.

2. The functionalized porous particle of claim 1, wherein the functional group is selected from the group consisting of esters, amides, ketones, imines, amines, nitriles, pyridines, ethers, thioethers, organophosphines, and electron rich π-system Lewis bases.

3. The functionalized porous particle of claim 2, wherein the electron rich π-system Lewis bases comprise ethyne, ethene, or benzene.

4. The functionalized porous particle of claim 1, wherein the functional group is a Lewis base.

5. The functionalized porous particle of claim 1, wherein the functional group is linked to the porous particle with a linker having a spacer of three or less atoms.

6. The functionalized porous particle of claim 1, wherein the carbon particle is an activated carbon.

7. The functionalized porous particle of claim 1, wherein the organosiloxy group is an organosilane.

8. The functionalized porous particle of claim 7, wherein the organosilane is a trialkoxy silane.

9. The functionalized porous particle of claim 1, wherein the organosiloxy group linked to a functional group is an organosiloxyamine group.

10. The functionalized porous particle of claim 1, wherein the functional group having affinity for a polysulfide is an amine.

* * * * *